United States Patent [19]
Tolberg et al.

[11] 3,708,570
[45] Jan. 2, 1973

[54] PERFLUORO AMMONIUM CATION-CONTAINING IONIC SALTS AND PROCESS FOR PREPARING THEM

[75] Inventors: Wesley E. Tolberg, Atherton; Roger S. Stringham, Woodside; Robert T. Rewick, Mountain View, all of Calif.

[73] Assignee: Stanford Research Institute, Menlo Park, Calif.

[22] Filed: Jan. 30, 1967

[21] Appl. No.: 614,524

[52] U.S. Cl. ..................423/301, 423/302, 423/464, 423/472

[51] Int. Cl. ..............................................C01b 9/08

[58] Field of Search......23/88, 53, 98, 105, 356, 357, 23/367, 368

[56] References Cited

UNITED STATES PATENTS 1,984,480 12/1934 Hene.......................................23/98

OTHER PUBLICATIONS

I Hydrazine. III, The Hydrazinium Salts of Complex Fluoro Acids of Tin, Antimony, and Bismuth, W. Pugh, H. C. G. Vincent, Chemical Abstracts Vol. 47, No. 9846b. 1953.

*Primary Examiner*—Carl D. Quarforth
*Assistant Examiner*—F. M. Gittes
*Attorney*—James Todorovic

[57] ABSTRACT

Solid ionic salts exemplified by perfluoro ammonium hexafluoro antimonate having the highly energetic perfluoro ammonium cation ($NF_4^+$), are produced by interreacting gaseous nitrogen trifluoride, gaseous fluorine, and liquid antimony pentafluoride (in the presence or absence of hydrogen fluoride), this reaction being preferably effected at a temperature of between about 100° C. and about 200° C., and at a superatmospheric pressure in the range of from about 50 atmospheres to about 200 atmospheres. The use of arsenic perfluoride, phosphorus perfluoride, or bismuth perfluoride, instead of the antimony perfluoride, results in the formation of the corresponding arsenate, phosphate or bismuthate salt, all of which are very stable, are powerful fluorination agents, and useful as oxidants.

6 Claims, No Drawings

PERFLUORO AMMONIUM CATION-CONTAINING IONIC SALTS AND PROCESS FOR PREPARING THEM

The present invention relates to certain novel highly fluorinated compounds, as well as to a simple and economical process of producing them in high yields. The novel solid ionic salts or solid ionic compounds have the general structural formula:

$$NF_4^+AF_6^-$$

wherein A is an element of the Va group of the Periodic Table, said element having an atomic weight in excess of 30. In other words, the letter A in the above structural formula represents the elements phosphorus, arsenic, antimony, and bismuth. As will be brought out more fully hereinbelow, these novel highly fluorinated compounds have certain properties which make them quite valuable. Thus, these ionic salts or complexes are very stable, are suitable as oxidants and fluorinating agents, and also suitable as intermediates for the introduction of the highly energetic perfluoro ammonium cation $NF_4^+$ moiety into other compounds.

In accordance with the preferred process, the subject salts may be formed, according to one phase of the present invention, by commingling in a suitable vessel, necessary or desirable amounts of nitrogen fluoride ($NF_3$), fluorine ($F_2$), and the pentafluoride of the particular element of group Va of the Periodic Table (excluding nitrogen), heating the mixture thus formed to a temperature of between about 100° C. and about 200° C. (or even higher), while the pressure within the reaction vessel is maintained at above about 50 atmospheres (and preferably at between about 50 atmospheres and about 200 atmospheres), and maintaining the reactants in said vessel and under said conditions of temperature and pressure for a period of time to cause them to interreact to produce the particular ionic salt or ionic complex corresponding to the pentafluoride (Lewis acid) used.

The yield of the particular ionic complex will depend primarily on the operating conditions used, and, to a somewhat lesser degree, on the particular pentafluoride used. Thus, as will be seen from a comparison of the data submitted in the illustrative examples, the yield of the ionic complex, and therefore of the $NF_4^+$ will vary, other conditions being equal, directly with the duration of the reaction, as well as with an increase in the reaction temperature employed.

When $NF_4SbF_6$ is prepared in accordance with the process of this invention, namely, by the interaction of $NF_3$, $F_2$ and $SbF_5$, the number of moles of $NF_4^+$ formed is equal to the number of moles of nitrogen trifluoride consumed (it being noted that no other products from other reactions involving the nitrogen trifluoride have been formed). Also, the reaction product obtained by the interaction of $NF_3$, $F_2$ and $SbF_5$ analyzed to be substantially quantitatively $NF_4SbF_6$, this being equally true for the reaction products obtained in accordance with the process of this invention when using $PF_5$, $AsF_5$ or $BiF_5$ instead of the $SbF_5$.

Because of the reactivity of fluorine (as well as of some of the fluorides) with various materials used in the construction of the reaction vessels, piping, etc., it is generally preferred to use Monel metal in such equipment. Even then there is some reaction between the metal of the reaction container and of fluorine. Therefore, it is usually found that the amount of fluorine consumed always exceeds the amount of nitrogen trifluoride consumed, this because of the aforementioned reaction of the fluorine with the container.

In general the reactants are maintained in the reaction vessel and under reaction-promoting conditions until all or most of the nitrogen trifluoride has reacted with the other two ingredients (viz. the equimolar amounts of fluorine and of the Lewis acid necessary for the reaction). This termination of reaction is determinable by noting the cessation of any material dropping of pressure in the reaction vessel.

At such time, the reaction product may be recovered by removing the unreacted starting materials from the reactor, this being effected by any one of the known procedures, e.g., repeated cooling and venting.

The ionic salt, e.g., the perfluoro ammonium hexafluoro antimonate, obtained in accordance with the above-outlined process, is stable in a very dry atmosphere, and also at temperatures as high as about 200° C. when under a vacuum. However, when subjected to temperatures of above about 300° C., it decomposes rapidly to nitrogen fluoride, fluorine and antimony pentafluoride. The corresponding ionic salts containing phosphorus, arsenic and bismuth, namely $NF_4PF_6$, $NF_4AsF_6$ and $NF_4BiF_6$ decompose at substantially the same temperature.

As indicated above, the novel solid ionic salts or complexes are excellent oxidizing and fluorinating agents. In fact, the perfluoro ammonium cation ($NF_4^+$) of these salts will fluorinate most, in not all, organic compounds, and inorganic compounds such as, for example, perchlorates, and, in the course of said fluorination reaction, it will form an acceptor for the fluoro acid portion of the molecule.

For instance, when solid LiF and solid $NF_4SbF_6$ are heated at about 250°C, the reaction product when analyzed indicates the presence of fluorine gas, nitrogen trifluoride and $LiSbF_6$. Thus, in this reaction the $NF_4^+$ oxidized $F^-$ to $F_2$.

The invention is illustrated by the following examples which are presented herein for the purpose of describing more clearly the process of the present invention, as well as the defined novel ionic salts. It is understood, however, that these examples are merely illustrative of the invention and should not be considered as limiting the invention in any sense.

EXAMPLE I

Gaseous nitrogen fluoride, gaseous fluorine, and antimony pentafluoride dissolved in liquid hydrogen fluoride, were introduced into a reactor made of monel metal. These reactants were used in a mole ratio of about 0.276 moles of HF, about 0.0974 of $SbF_5$, about 0.0699 of $F_2$, and about 0.0685 nitrogen trifluoride. The mixture was then heated at about 200° C. under a pressure of about 1,800 psi for a period of about 124 hours, at the end of which time the vessel was cooled. It was found that somewhat more than 60 percent (0.0420 moles) of the $NF_3$ initially present was converted to a solid product which was light grey-brown in color. Almost all of the fluorine (specifically, 99.7 percent), as well as 100 percent of the antimony pentafluoride were consumed, while the hydrogen fluoride was recovered quantitatively. An elemental analysis of the solid reaction product indicated the presence of complex antimonate fluoride anions.

When a portion of the reaction product produced by the process of this example was heated at 200° C. for three days in vacuo, it analyzed substantially quantitatively (99.5%) to be $NF_4SbF_6$:

| | N | Sb | F |
|---|---|---|---|
| Calc. for $NF_4SbF_6$: | 4.30 | 58.33 | 37.37 |
| Found: | 4.27 ±0.04 | 57.85 ±0.06 | 37.64 ±1.5 |

EXAMPLE II

The above run was repeated. However, in this case the reaction time was decreased to 50 hours and the concentration of both $NF_3$ and $F_2$ was increased, the reactants charged into the vessel being equal to: 0.232 moles of hydrogen fluoride, 0.0669 moles of antimony pentafluoride, 0.0836 moles of nitrogen trifluoride, and 0.128 moles of fluorine gas. The reactor was (just as in the first example) heated to 200° C., the calculated reactor pressure being thus equal to about 2400 psi. On removal of the unreacted starting materials, it was found that 43.7 percent (equal to 2.6 gm) of the $NF_3$ present has reacted. No antimony pentafluoride was recoverable.

After the reactor was placed in a dry box and opened, the solid reaction product was removed from the vessel and placed in a monel vessel wherein it was heated under vacuum for several days at about 200° C. to decompose the complex antimonate fluoride anions, and to convert this product to $NF_4SbF_6$. In order to recover the thus produced $NF_4SbF_6$, the reaction product is worked up by any of the well-known means and techniques, including repeated dissolving, e.g., in HF, and separation of the solute from the insoluble residue, followed by flashing off of the HF. An analysis of the resulting product proved that it consisted substantially of $NF_4SbF_6$.

EXAMPLE III

The run described in Example II was repeated, using substantially the same amounts of the starting materials except that in this case no hydrogen fluoride was used. Thus, about 0.0664 moles $SbF_5$, about 0.133 moles $F_2$ and about 0.0865 moles $NF_3$ were introduced into the reaction vessel made of monel metal, and the reaction mixture was heated therein to about 200° C. for a period of about 50 hours. The calculated pressure in the vessel was equal to about 2,250 psi. At the end of the reaction period, the mixture in the vessel was worked up in the same manner as in the previous examples. It was found that the three reactants introduced into the vessel did in fact interact to form $NF_4SbF_6$ in a high yield even though no hydrogen fluoride was employed. It was also found that less fluorine and antimony pentafluoride was consumed in this run than in the run of Example II, while the conversion of $NF_3$ was very nearly the same. Consequently, contamination by monel salts (formed by reaction of fluorine and/or antimony pentafluoride with the metal of the reaction vessel) was substantially less than in the product of the run described in Example II. This was confirmed also by the whiter appearance of the solids present in the vessel as well as by various analyses including those involving recovery of unreacted $SbF_5$ and also nmr spectrum analysis of the reaction product.

EXAMPLE IV

For this run the mixture introduced consisted of 0.106 mole $AsF_5$ gas, 0.118 mole nitrogen fluoride gas and 0.131 mole of fluorine gas. The mixture was then heated to 125° C., the estimated pressure being initially approximately 3,000 psi. The mixture was maintained at the above temperature of 127° C. for about 260 hours, at the end of which time the vessel was cooled to −196°C and the gases remaining in the vessel were distilled into a receiver cooled to −210° C. From the analysis of the volatile materials, it was found that 17% of the $NF_3$, 23% of the $AsF_5$ and 26% of the $F_2$ had reacted. Elemental analysis of the reaction product and an nmr spectra study showed that the product was about 93% $NF_4AsF_6$, the impurity being mainly $Ni(AsF_6)_2$ from the monel reactor.

EXAMPLE V

When the run described in Example IV is repeated except for the use of $PF_5$ instead of $AsF_5$, the reaction mixture, when worked up, indicates that it contains $NF_4PF_6$.

EXAMPLE VI

When the run described in Example IV is repeated except for the use of $BiF_5$ instead of $AsE_5$, the reaction mixture, when worked up, indicates that it contains $NF_4BiF_6$.

The $NF_4^+$ salts of the present invention react readily with moisture in the atmosphere but are stable indefinitely in a nitrogen atmosphere. Also, as previously indicated, the $NF_4^+$ salts of this invention, as exemplified by $NF_4SbF_6$, are thermally stable at 200° C., but decompose at or above 300° C. according to the reaction:

$$NF_4SbF_6 \rightarrow NF_3 + F_2 + SbF_5$$

It is to be understood that the invention includes all modifications, particularly as they come within the scope of the appended proven claims.

We claim:

1. A solid ionic salt having the general structural formula $$NF_4^+AF_6$$

wherein A represents an element of the Va group of the Periodic Table, said element having an atomic weight greater than 30.

2. A solid ionic salt according to claim 1, wherein A represents the element antimony.

3. A solid ionic salt having the general structural formula of claim 1, wherein A represents the element arsenic.

4. The process for producing highly fluorinated salts having the general structural formula $$NF_4^+AF_6^-$$

wherein A represents an element of the group Va of the Periodic Table, said element having an atomic weight greater than 30, which process comprises commingling nitrogen fluoride, fluorine and a pentafluoride of the aforesaid element of group Va of the Periodic Table, and maintaining said mixture at a temperature of above about 100° C. and a pressure of at least 50 atmospheres for a period of time sufficient to cause interaction between the three commingled chemical compounds.

5. The process for producing a highly fluorinated ionic salt having the general structural formula $$NF_4^+SbF_6^-$$

which process comprises commingling nitrogen fluoride, fluorine, and antimony pentafluoride, maintaining said mixture at a temperature of above about 100° C. and a pressure of at least 50 atmospheres for a period of time sufficient to cause interaction between the three commingled chemical compounds, and separating $NF_4^+SbF_6^-$ from the reaction mixture.

6. The process according to claim 4 wherein the mixture subjected to treatment is heated to about 200° C. for about 50 hours at a pressure of about 150 atmospheres.

* * * * *